United States Patent
Agrawal et al.

(10) Patent No.: US 7,733,555 B2
(45) Date of Patent: Jun. 8, 2010

(54) ENVIRONMENTALLY SAFE ELECTROCHROMIC MIRRORS

(75) Inventors: Anoop Agrawal, Tucson, AZ (US); John P. Cronin, Tucson, AZ (US); Juan Carlos Lopez Tonazzi, Tucson, AZ (US)

(73) Assignee: Electro ChromiX, Inc., Tucson, AZ (US)

( * ) Notice: Subject to any disclaimer, the term of this patent is extended or adjusted under 35 U.S.C. 154(b) by 655 days.

(21) Appl. No.: 11/454,055

(22) Filed: Jun. 15, 2006

(65) Prior Publication Data

US 2006/0285190 A1      Dec. 21, 2006

Related U.S. Application Data

(60) Provisional application No. 60/692,025, filed on Jun. 17, 2005.

(51) Int. Cl.
*F02F 1/15* (2006.01)
(52) U.S. Cl. .................. 359/265; 359/267; 359/245
(58) Field of Classification Search ............ 359/265, 359/267, 268, 270, 245, 238
See application file for complete search history.

(56) References Cited

U.S. PATENT DOCUMENTS

| | | | |
|---|---|---|---|
| 3,280,701 A | 10/1966 | Donnelly et al. | |
| 4,382,909 A | 5/1983 | Zwingmann | |
| 4,712,879 A | 12/1987 | Lynam et al. | |
| 4,902,108 A | 2/1990 | Byker | |
| 5,066,112 A | 11/1991 | Lynam et al. | |
| 5,138,219 A | 8/1992 | Krisl et al. | |
| 5,140,455 A | 8/1992 | Varaprasad et al. | |
| 5,233,461 A | 8/1993 | Doman et al. | |
| 5,300,374 A | 4/1994 | Agrawal et al. | |
| 5,724,187 A | 3/1998 | Varaprasad et al. | |
| 5,818,625 A | 10/1998 | Forgette et al. | |
| 5,910,854 A | 6/1999 | Varaprasad et al. | |
| 5,928,572 A | 7/1999 | Tonar et al. | |
| 6,111,684 A | 8/2000 | Forgette et al. | |
| 6,166,848 A | 12/2000 | Cammenga et al. | |
| 6,195,193 B1 | 2/2001 | Anderson et al. | |
| 6,203,304 B1 | 3/2001 | Lopez Tonazzi et al. | |
| 6,639,708 B2 | 10/2003 | Elkadi et al. | |
| 6,665,107 B2 | 12/2003 | Forgette et al. | |
| 6,717,732 B2 | 4/2004 | Meyr et al. | |
| 6,853,472 B2 | 2/2005 | Warner et al. | |
| 6,899,437 B2 | 5/2005 | Bauer | |
| 7,255,451 B2 * | 8/2007 | McCabe et al. ............. 359/605 |

(Continued)

OTHER PUBLICATIONS

F.W. Billmeyer and M. Saltzman, "Principles of Color Technology", 2nd Edition, J. Wiley and Sons Inc. (1981).
Daniel Colbert, "Single-wall manotubes: a new option for conductive plastics and engineering polymers." Plastics Additives and Compounding Magazine, Jan.-Feb. 2003. pp. 18-25.

*Primary Examiner*—Timothy J Thompson
(74) *Attorney, Agent, or Firm*—Lawrence R. Oremland, P.C.

(57) ABSTRACT

This invention recognizes the hazards of beryllium and beryllium oxide in automotive applications and offers alternative material solutions. In particular, commercial electrochromic mirrors use beryllium comprising alloys for busbars and may also use beryllium oxide for the electronics used to power and control these mirrors. Further, this can be combined by reducing other known hazards such as mercury, cadmium, lead and antimony compounds.

8 Claims, 4 Drawing Sheets

U.S. PATENT DOCUMENTS

2004/0233537 A1 11/2004 Agrawal et al.
2006/0027260 A1 2/2006 LeCompte et al.
2006/0028730 A1* 2/2006 Varaprasad et al. ......... 359/604
2007/0184284 A1* 8/2007 Varaprasad et al. ......... 428/426

* cited by examiner

ENVIRONMENTALLY SAFE ELECTROCHROMIC MIRRORS

RELATED APPLICATION/CLAIM OF PRIORITY

This application is related to and claims priority of provisional application Ser. No. 60/692,025, filed Jun. 17, 2005, which provisional application is incorporated by reference herein.

BACKGROUND OF THE INVENTION

Electrochromic rearview mirrors have long been incorporated into vehicles for providing automatic control of glare to a vehicle operator. EC Rearview mirrors are often times mounted both inside and outside the vehicle or only on the inside. Some of the patents that describe electrochromic devices usable for mirrors are U.S. Pat. Nos. 3,280,701, 4,712,879, 4,902,108; 5,140,455, 5,724,187, 6,111,684; 6,166,848, 6,853,472 and published patent application 2004/0233537.

Such commercially available mirror assemblies comprise of an EC cell enclosed in a casing along with attachment mechanism to the vehicle, powering electronics and other electrical and electronic features. These mirror assemblies may comprise of materials which are harmful to the environment. In one aspect this invention describes novel combination of materials to reduce environmental degradation and safety, particularly for those who are involved when these systems are being made or removed and recycled or disposed at the end of their life cycle.

Typically, the mirrors have a perimeter molding which forms a lip on the front surface to hide or block the perimeter busbars, connections or adhesives from being observed. Recently, mirrors are being introduced, particularly for the outside rear-view mirrors that do not have a formed bezel or a molded lip on the front substrate. It is claimed that such mirrors also provide superior vision, as the mirror area available for reflection increases by the inclusion of this perimeter. In this invention novel ways are described that keep this utility while enhancing the mirror appearance.

Most commercial EC mirrors use liquid electrolytes, which have the potential to leak and damage the car interiors or exterior coatings and paints. Multiphase electrolytes have been recently disclosed which can solidify the electrolyte. New compositions of electrolyte which form multiphase solids with lower viscosity are disclosed which result in superior processing behavior of the devices.

BRIEF SUMMARY OF THE INVENTION

One objective of this invention is to disclose electrochromic mirrors with materials which result in safer environment to the people who are associated with it while also protecting environmental pollution.

Another objective of the invention is to disclose EC mirrors which enhance the visual appearance by increasing the surface area of the mirrors.

Yet another objective of this invention are solid electrolytes for EC mirrors which have lower viscosity characteristics during processing.

DETAILED DESCRIPTION OF THE INVENTION

Embodiment 1

Low Toxicity Mirrors

Figure 1A:
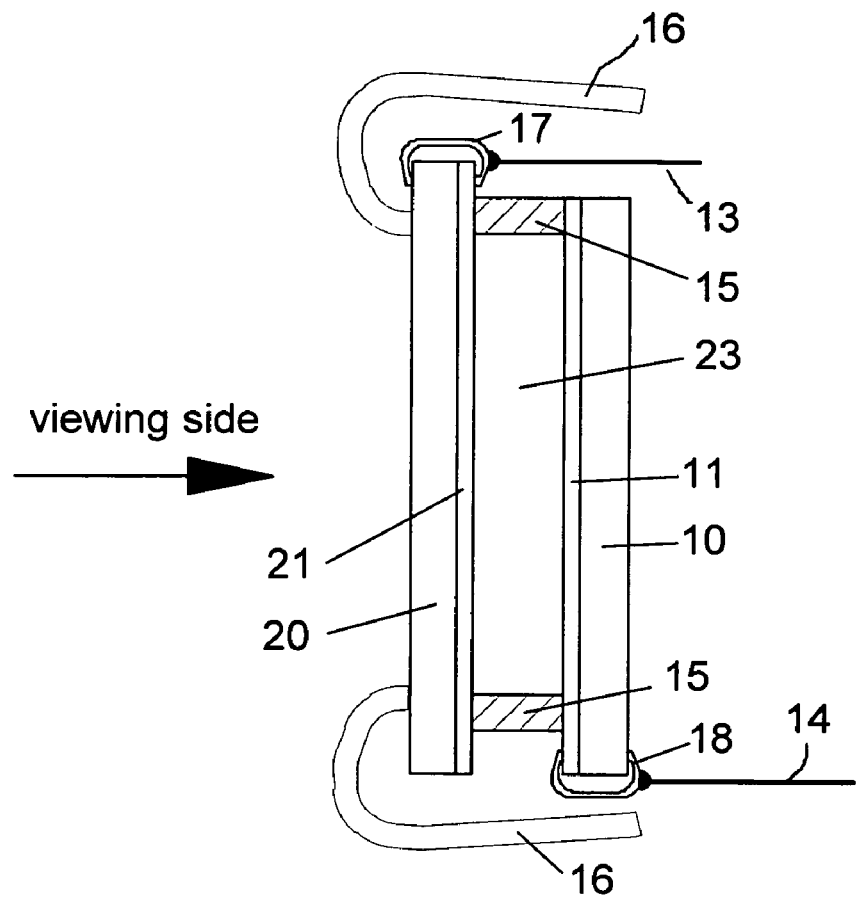
FIG. 1a: Construction of a prior art EC device.

With the increased numbers of variable reflectance mirrors being used, there is a correspondingly increased desire to provide an environmentally improved variable reflectance mirror design. Millions of mirrors are being produced annually that incorporate variable reflectance elements with the above mentioned components. As an example U.S. Pat. No. 6,899,437 addresses this issue and this patent is herein incorporated in its entirety by reference. As discussed below this patent recognizes heavy elements such as cadmium, mercury and lead and some compounds having chlorine, bromine and antimony as threats to the environment. However, this does not recognize threats caused by beryllium.

Although all commercial mirrors, particularly single compartment (liquid or solid electrolyte) do not contain all of these known hazards, but all of these use busbar clips that use beryllium as one of its components. Some of the hazardous contaminants may come from photocells or corrosion resistant coatings which may comprise cadmium, lead from solders, bromine and antimony oxide from flame retardants in printed circuit-boards and mirror housings and mercury from electrical switches. Chlorine and bromine have been identified as hazards in the above patent, however, in many applications they are incorporated safely and need not be hazardous. Thus elimination of these materials in addition to the others is preferred but not necessary.

In general all hazardous materials identified in U.S. Pat. No. 6,899,437 are known in automotive industry and several precautions are taken in commercial products, however, hazards to beryllium although known, are largely ignored, Even U.S. Pat. No. 6,899,437 does not recognize this hazard. All of the measures for the previously identified hazards can be optionally taken in addition to reducing the hazard from beryllium, or mirrors which only address the beryllium issue can be manufactured using this innovation.

Beryllium is a metal that is used in a wide variety of industries including electronics, aerospace, defense, and the Department of Energy (DOE) complexes. Exposure to beryllium containing particles can lead to a lung disease called chronic beryllium disease (CBD). CBD involves an uncontrolled immune response in the lungs that can lead to deterioration in breathing capacity and ultimately death. It is clear that even in processes where beryllium dust has been controlled to very low levels cases of disease still persist.

In fact, there have been cases of CBD reported in people that have had no obvious direct contact with beryllium operations. Despite the fact that very low exposure levels can lead to CBD, the onset of disease can take decades. Quoted from a published article by Newman "Microgram for microgram, beryllium is one of the most toxic elements on the periodic table. When engineers select beryllium alloys for new applications, they consider its desirable properties of light weight, durability, conductivity, or neutron moderation. Unfortunately, they are often condemning workers "downstream" to a lifelong risk for an incurable illness that affects up to 20% of people exposed."

Recent new regulations from DOE dictate a permissible exposure limit of 0.2 µg/m$^3$ in air, a housekeeping level of 3 µg/100 cm$^2$ on a surface, and a release level for materials after beryllium exposure where the surface contamination due to beryllium must not exceed 0.2 µg/100 cm$^2$. There is a discussion in the beryllium community if the permissible air exposure limit needs to be lowered to 0.02 µg/m$^3$. The use of beryllium exposes workers who work upstream from auto component manufacturing, autoworkers, consumers and then those who are involved with the salvage industry.

Beryllium is used in the automotive mirrors in at least two places. One being the busbars or spring clips to provide power to the transparent conductors as beryllium-copper alloys and the other as beryllium oxide in the electronics where its properties of electrical insulation but high thermal conductivity are useful. The electronics for EC mirrors is housed in the mirror casing. In many shielding (from electromagnetic interference and radio frequency interference) operations, BeCu coatings and patterns are also used. Be comprising alloys are also used extensively in power connectors automotive terminals, switches and relays; SIM card contacts; and appliance switches, relays, sensors, and controls. BeCu alloys have high strength, low corrosion and excellent relaxation characteristics. Examples of alloys beryllium copper are for example, alloys selected for high strength (Alloys 25, 190, 290, M25 and 165) and those alloys selected for high conductivity (Alloys 3, 10, 174 and Brush 60). Beryllium, nickel and copper alloy example is alloy 390. Alloy 360 comprises of beryllium, titanium and Nickel. AlBeMet is an aluminum beryllium alloy. All of these alloys are available from Brush Wellman (Cleveland, Ohio).

Although materials for replacing beryllium in these specific applications are known, the hazard is not recognized by the auto industry where active steps are being taken to reduce and eventually eliminate the use of beryllium from components. Beryllium poses problems not only in automotive mirrors but anywhere where electronics is used as beryllium metal or as beryllium oxide. It is desirable to get rid this material from automobiles and preferably from any other consumer products. Beryllium as particles can enter the human body both through inhalation and through the skin. The particles are caused during cutting, cleaning, vapor processes, etc. Thus the greatest threat is to the workers engaged in operations with beryllium containing materials. Some of these particles are left over on the surface of the parts from prior processing operations and thus may enter the environment during use. In many components such as mirrors, high temperatures (in excess of 300 C) are not seen in operation, thus it is not necessary to use beryllium alloys that typically result in high creep resistance at elevated temperatures.

A preferred substitute for beryllium oxide for use in electronics and integrated circuit chips as good insulator and high thermal conductivity is aluminum oxide. Aluminum nitride and aluminum oxy nitrides are more preferred alternatives. For alloys comprising of beryllium and copper there are many substitutes depending on the level of performance. Since the mirrors do not consume large currents and temperatures are generally restricted below 125 C, several choices are available. Some of these are phosphor bronze, titanium and steel (e.g. stainless steel 316, 304, 303 and 302). Some of the more preferred substitutes are alloys of cobalt and chromium (which may also comprise of tungsten, rhenium, gallium and aluminum (e.g. see U.S. Pat. No. 4,382,909); tantalum, nickel, tin and copper alloys; Nickel-silicon-chromium and copper alloy from Kyoei Sangyo Ltd (Tokyo, Japan); Duracon an iron, nickel and cobalt alloy from Vacuum Slhmelze GmBh Co Kg (Germany) and Inconel X-750. Some other choices are 301Stainless steel (UNS#S30100), aluminum brass alloy 688 (UNS #C68800), Phosphor bronze alloy KLF5 (UNS#C50715) and silicon bronze alloy (UNS#C65400), copper-Nickel-tin alloys, copper-titanium alloys (with copper from 0.5 to about 12% by weight, preferred range being 1 to about 3%).

Thereby, the preferred rearview mirror assembly in accordance with one embodiment of the present invention is substantially free of beryllium. It is within the scope of the present invention to use any beryllium free spring clips and beryllium free coatings, connectors and beryllium oxide free coatings in electronics. It is also preferred to avoid the use of beryllium comprising alloys and beryllium oxide in automobiles and its components. Further, it is important to avoid use of beryllium along with at least one of the other hazards in the mirror such as mercury, cadmium, lead, hexavalent chromium, arsenic, and bromine.

Embodiment 2

Low Viscosity Electrolytes

Solid electrolytes for mirrors and other EC devices are disclosed in several patents. For example U.S. Pat. Nos. 5,300,374, 5,910,854, 5,928,572 disclose EC devices with solid electrolytes which are formed by cross-linking the electrolyte after the device is filled with the electrolyte comprising monomers, typically using backfilling as described in U.S. Pat. Nos. 5,140,455 and 6,853,472. U.S. Pat. No. 6,639, 708 discloses electrolytes which are laminated in a sheet form between the two substrates, and published US patent application 2004/0233537 discloses electrolytes that form solid upon cooling by formation of multiphase system. US patent application 2004/0233537 is herein incorporated in its entirety by reference. This method involves heating the electrolyte above its melting point and then injecting this into a pre-formed cavity formed by the two coated substrates. One may use several ways of injecting the electrolyte under pressure, and one of such methods is described in U.S. Pat. No. 6,203,304.

In any of the filling processes it is preferred that the electrolyte during filling have a low viscosity so that the cavities can be filled faster or at a lower injection pressure. Further, most solvents for electrolytes such as propylene carbonate, sulfolane, gamma-butyro lactone and ionic liquids have low vapor pressures or negligible vapor pressures. Since for most EC cavities used for mirrors windows and displays, etc., the distance between the two substrates forming the cavity of the device is usually less than 300 µm, large injection pressures are required with increasing viscosity of the electrolyte. When these devices are formed using thin substrates, e.g., rear-view mirrors with each substrate in a thickness of about 2.3 mm or less (e.g. 1.7 to 1.1 mm), these can deform or even break.

US patent application 2004/0233537 shows example of electrolytes comprising polymers which when cooled result in a multiphase solid formation (this means that when the electrolyte is solidified there are at least two or more phases). Preferably, one of the phases has melting or softening point above the use temperature (called hard phase) and at least one phase has melting or softening point below (or glass transition temperature, Tg) the use temperature (called soft phase). Typically a polymer chain meanders through several phases (hard and soft), where its movement in the hard phase is restricted and in the soft phase may even be liquid like. It is the restrain from the hard phase that results in solidification of the electrolyte. Generally, a polymer chain passes through a couple of domains of hard phase (and thus restrained) which is separated by soft phase. Morphologically the solid electrolyte will appear as a continuum of soft phase with interdispersed domains of hard phases. Thus the volume fraction of the hard phase must be less then 50%, preferably less than 30%. The polymer chains (or a fraction of them) are restrained at least at two points as they pass through the hard domains resulting in the electrolyte solidification. For electrochromic devices it is preferred that the difference in the refractive index of the hard and the soft phases be low (typically less than 0.1), or the size of the hard phase be smaller then 500 nm so that haziness due to light scattering is minimized. Typically, it is desired that the Haze value of the electrolyte in an electrochromic cell in bleached state be below 0.2% and preferably below 0.1%. Haze may be measured by using ASTM (American Society for Testing Materials) test method D1003.

In an example provided, the viscosity of the electrolyte between the filling (or processing) temperatures of 120 to 100 C was in the vicinity of 2000 cP to 3000 cP. Generally, processing temperatures are about 20 C or more higher than the finishing point of the melting/softening endotherm. Although the broader scope of this invention is covered by US patent application 2004/0233537 this invention identifies formulations that were surprisingly found to have lower viscosities. In this invention we found that by making changes to the polymer and the solvent composition, the viscosity could be lowered by about a factor of 2 or lower, i.e., less than 1000 cP at the processing temperatures. This change did not have a noticeable change on the melting point of the electrolyte. The devices made had acceptable performance for mirrors and other applications. Electrolyte compositions which at reasonable processing temperatures have a viscosity below 1000 cP and form multiphase solids upon cooling are called low viscosity electrolytes. Examples of solvents, polymers, dyes and other additives can be found in published US patent application 2004/0233537. The preferred polymers were copolymers. Some preferred commercial grades of fluorinated copolymers comprise at least one of vinylidene fluoride and hexafluoropropylene. Depending on the temperature range of device operation and its interaction with the other electrolytic components, one or more of these may be selected. Atofina (Philadelphia, Pa.) sells these under the tradename of Kynar™ and some of the grades are 301F, 741 LBG and Kynar Flex 2801 and these may also be obtained from Solvay (Thorofare, N.J.) under the trade name of SOLEF™ and some of the grades being 1015, 6020, 21216, 20816, 20615 and 11008. These materials also have good UV stability. Some of the preferred non-ionic solvents are propylene carbonate, ethylene carbonate, dimethyl carbonate, ethylmethyl carbonate, dipropyl carbonate, diethoxy ethane, sulfolane, methyl sulfolane, cyanoethylsucrose, 3-hydroxypropionitrile, 3-3'-oxydipropionitrile, 2-methylglutaronitrile, acetylbutyrolactone, and gamma-butyro lactone. Flourinated carbonates may also be used. Ionic liquids may also be added to the solvents. The preferred quartenary ammonium cations for ionic liquid include, but are not limited to, pyridinium, pyrrolidinium, pyridazinium, pyrimidinium, pyrazinium, imidazolium, pyrazolium, thiazolium, oxazolium, and triazolium. These can have various substitutions or substituents, such as H, F, phenyl and alkyl groups with 1 to 15 carbon atoms. Rings may even be bridged. Preferred anions are fluorine containing such as triflate ($CF_3SO_3^-$), imide ($N(CF_3SO_2)_2^-$), beti (($C_2F_5SO_2)_2N^-$), methide ($(CF_3SO_2)_3C^-$), tetraflouroborate ($BF_4^-$), hexaflourophosphate ($PF_6^-$), hexafluoroantimonate ($SbF_6^-$), $C_2H_5SO_4^-$ and hexafluoroarsenate ($AsF_6^-$). Of these, imide, beti and methide anions are more preferred. An example of a preferred ionic liquid (IL) is 1-Butyl-3-Methyl Pyrrolidinium bis (trifluoromethanesulfonyl)imide (BMP). Further hydrophobic ionic liquids are more preferred to lower the device sensitivity to moisture ingress. It has been found that to attain low processing-viscosity, it is preferred to have a weight ratio of "ionic liquid: non-ionic solvents" 1:1 or lower (i.e., non-ionic liquids are in excess or the solvents in the electrolyte mostly comprise of non-ionic liquids). Some of the preferred systems have no ionic liquids or the above ratio of about 1:10. A preferred range of polymer solid content is about 5 to 20 weight percent based on the weight of the solvents. If the polymer concentration is lowered too much, then one may not obtain a solid and if it is too high the viscosity would increase. A highly Preferred number average molecular weight of the polymers is about 50,000 (preferably less than 200,000) with a polydispersity of less than 2 so that the processing viscosity is not too high. UV stabilizers may also be added to the electrolyte. Some of the common UV stabilizers are benzophenones, benzotriazoles, and triazines more detailed list is given in Modern Plastics Encyclopedia (McGraw Hill, (2001) section C120-C122). Recently some of the UV stabilizers have been made available using modified structures which are called "red-shifted". These are able to protect the devices better from the UV just below 400 nm. Examples of these are Tinuvin 928, CGL777 and CGL139 from Ciba Specialty Chemicals (Tarrytown, N.Y.). These may be mixed with conventional UV stabilizers for addition to the electrolytes for better protection in both shorter and longer UV wavelengths.

Depending on the electrochromic system used, one may add other materials to the electrolyte. These can be lithium salts, ammonium salts, other dissociable salts, anodic dyes, cathodic dyes or bridged dyes where more than one functionality is imparted by the dye molecule, e.g., dye with anodic and cathodic moiety, dye with UV stabilizer moiety attached and so on. Preferred dye systems useful for rear-view mirrors preferred cathodic dyes are based on viologens and the preferred anodic dyes are based on phenazines, phenothiazines or ferrocenes. Preferred bridged dyes are combinations of viologens with either ferrocenes or phenazines. The preferred anions in viologen dyes or the preferred bridged dyes or in salts are halogen containing such as perchlorate $ClO_4^-$, triflate ($CF_3SO_3^-$), imide ($N(CF_3SO_2)_2^-$), beti (($C_2F_5SO_2)_2N^-$), methide ($(CF_3SO_2)_3C^-$), tetraflouroborate ($BF_4^-$), hexaflourophosphate ($PF_6^-$), hexafluoroantimonate ($SbF_6^-$), $C_2H_5SO_4^-$ and hexafluoroarsenate ($AsF_6^-$). Of these, imide, beti and methide anions are more preferred.

When low viscosity electrolytes of this invention are injected into EC cavities and cooled, they form a solid by forming multiple phases. The polymer segments are able to form small crystalline domains or a (second phase or hard phase) which imparts the solidness, while the other segments of the polymer are largely in an amorphous phase (soft phase) which is generally liquid like as its crystallization point or solidification point is lower then typical use temperatures. The composition of the crystalline phases is different from the amorphous phase in terms of solvent, dye and other additives which may have been added. There may be more than one crystalline phase depending on the polymer chain configuration. This multiphase nature of the electrolyte is maintained regardless of the optical state of the device (i.e., whether it is colored or bleached). Multiphases (more than one phase) may also be formed by means other than crystallization. More on this is discussed in patent application 2004/0233537

Example 1

Preparation and Characterization of Solid Electrolyte E1

A solid electrochromic electrolyte was prepared by combining under nitrogen 1.0 gram of a copolymer of vinylidene fluoride and hexafluoropropylene, supplied by Solvay (Thorofare, N.J.) under the trade name Solef 20615/1001, with 10 milliliters of propylene carbonate while stirring at 130° C. for one hour. The mixture was cooled to room temperature and 0.3834 g (0.039 molar solution) of the electrochromic dye Fc-Vio imide (1-(4-Ferrocenylbutyl)-1-methyl-4-bipridinium and 1,1,1-trifluoro-N-[(trifluoromethyl) sulfonyl]-methanesulfonamide salt) added under nitrogen atmosphere. Fc-Vio imide is a dye which has an anodic moiety (ferrocene) which is covalently linked to a cathodic moiety (viologen cation) and the anion is imide. The mixture was heated to 100° C. for one hour while stirring to form a complete solution. The electrolyte was degassed under vacuum for 10 minutes at 100° C. and when cooled to room temperature was a solid material. The viscosity of the electrolyte was measured using a Brookfield Digital Rheometer with a cone and plate attachment and temperature control to within 0.5° C. The results are shown in the following table:

| Temp ° C. | Viscosity (CPS) |
|---|---|
| 70 | 482 |
| 80 | 412 |
| 90 | 343 |
| 100 | 294 |
| 110 | 251 |
| 120 | 218 |

From the viscosity data the glass transition temperature (Tg) of the electrolyte was calculated to be −70° C. The electrolyte had a solid to liquid temperature (TM) of 82° C. as visually observed by leaving a sealed bottle of the electrolyte in the oven and perturbing the bottle. The viscosities are measured at elevated temperatures and then the electrolyte is cooled and measured again. The viscosities can be measured at lower than the melting points due to the supercooling effect, where it takes a long time for the material to solidify by crystallization or the temperature has to be lowered significantly before crystallization kicks in. Once solidified, the material has to be heated to higher temperatures than the solidification point for melting to take place.

Example 2

Preparation and Characterization of Solid Electrolyte E2

A solid electrolyte was prepared as described in example 1 above except the concentration of the polymer Solef 20615/1001 was increased from 1.0 to 1.43 grams (from 7.6 to 10.5 wt. %). The viscosity of the electrolyte was determined as described in example 1 and it had the following viscosity as a function of temperature:

| Temp ° C. | Viscosity (CPS) |
|---|---|
| 70 | 2527 |
| 80 | 1976 |
| 90 | 1572 |
| 100 | 975 |
| 110 | 768 |
| 120 | 622 |

From the viscosity data the glass transition temperature (Tg) of the electrolyte was calculated to be −95° C. The electrolyte had a solid to liquid temperature (TM) of 82° C. from visual inspection in an oven as described above.

The thermal stability of the electrolyte was tested by repeated cycles between 25 and 130° C. with no change in the color or physical properties of the electrolyte. The electrolyte was stored at −19° C. for three days and at 50° C. for twenty four hours with no change in physical properties.

Example 3

Preparation and Characterization of Solid Electrolyte E3

A solid electrolyte was prepared in a mixed solvent system by combining under nitrogen 1.0 g of Solef 20615/1001 with 9.5 milliliters of propylene carbonate and 0.5 milliliters of 1-Butyl-1-methylpyrrolidinium salt with 1,1,1-trifluoro-N-[(trifluoromethyl)sulfonyl]-methanesulfonamide. The mixture was stirred at 130° C. for one hour to form a clear viscous liquid. The mixture was cooled to room temperature and 0.3227 g (0.03276 moles) of the electrochromic dye 1-(4-Ferrocenylbutyl)-1-methyl-4-bipridinium salt with 1,1,1-trifluoro-N-[(trifluoromethyl) sulfonyl]-methanesulfonamide was added under nitrogen atmosphere. The mixture was heated to 100° C. for one hour while stirring to form a complete solution. The electrolyte was degassed under vacuum for 10 minutes at 100° C. and when cooled to room temperature was a solid material. The viscosity data for the electrolyte determined as described in example 1 is shown below:

| Temp ° C. | Viscosity (CPS) |
|---|---|
| 70 | 512 |
| 80 | 428 |
| 90 | 356 |
| 100 | 294 |
| 110 | 253 |
| 120 | 218 |

From the viscosity data the Tg of the electrolyte was calculated to be −65° C. The electrolyte had a solid to liquid temperature ($T_M$) of 84° C. Results from the differential scanning calorimeter indicated that depending on the thermal history, the melting point onset was about 60° C., with a peak at about 65 to 71° C. with melting completed at about 73 to 78° C. A maximum melting enthalpy of 2.9 J/g was measured.

Example 4

Characterization of Solid Electrolyte E4

A solid electrolyte was prepared by combining under nitrogen 1.427 grams of Solef 20615/1001 with 10 milliliters of propylene carbonate while stirring at 130° C. for one hour. The mixture was cooled to room temperature and 0.4186 g (0.055 moles) of an electrochromic dye where an anodic phenazine moiety was covalently linked to a viologen moiety (Ph-Vio 2BF$_4^-$), was added under nitrogen atmosphere. The mixture was heated to 100° C. for one hour while stirring to form a complete solution. The electrolyte was degassed under vacuum for 10 minutes at 100° C. and when cooled to room temperature was a solid material. Details of the dye are given in the reference by Michaelis, A., et al, Advanced Materials, vol 13 (2001) p-1825.

Example 5

Characterization of Solid Electrolyte E5

A solid electrolyte was prepared in a mixed solvent system by combining under nitrogen 1.427 grams of Solef 20615/1001 with 9:5 milliliters of propylene carbonate and 0.5 milliliters of 1-Butyl-1-methylpyrrolidinium salt with 1,1,1-trifluoro-N-[(trifluoromethyl)sulfonyl]-methanesulfonamide. This mixture was stirred at 130° C. for one hour to form a complete solution. The mixture was cooled to room temperature and 0.4186 g (0.055 moles) of the same dye as in electrolyte E4 was added under nitrogen. The mixture was heated to 100° C. for one hour while stirring to form a complete solution. The electrolyte was degassed under vacuum for 10 minutes at 100° C. and when cooled to room temperature was a solid material.

Example 6

Cell Fabrication and Cell Filling

Two pieces of 12 Ω/sq. ITO were cut into 2"×2.5" sections. One piece was drilled with two fill holes at opposite ends of the long diagonal. Cells were made by applying an epoxy containing spherical glass spacers (spacer size, e.g., 125, 102 or 88 μm) to the perimeter of one of the ITO substrates. The second substrate was then placed on top of the epoxy coated ITO glass, in a position which was slightly off-set along the long side for busbar application (i.e., the busbar was applied on the short side). Clamps were applied to the assembly at the epoxy perimeter to ensure intimate contact as well as to ensure the cell spacing conformed to the spacer size in the epoxy. The epoxy seal was cured in an oven at 150° C. for one hour. They were then filled with electrolyte under a dry inert atmosphere by injecting the medium through one of the fill holes. Both the holes were subsequently sealed using a room temperature UV curing acrylic. The filling of cells was done at 100° C., where both the cell and the electrolyte were heated. Conductive metal clips (busbars) with soldered leads were placed on the two offset conductive edges. These formed the electrical contacts to each electrode.

Example 7

A solid electrolyte was prepared with composition E3. This was used to fill two window cells prepared as described in example 6, one with a cell gap of 88 μm and the other 102 μm. The electrolyte and cell were heated to 100° C. to enable free flow of the electrolyte into the cell cavity. The color coordinates and percent haze of the cells were measured using an Ultra Scan XE Colormeter in the total transmission mode. This data for the cells is shown in the following table:

| Cell Gap | X | Y | Z | % Haze |
|---|---|---|---|---|
| 88 μm | 75.41 | 81.74 | 78.62 | 0.05 |
| 102 μm | 74.90 | 81.14 | 78.21 | 0.06 |

Example 8

Electrolytes were prepared with composition E1 except that the electrochromic dye concentration was varied between 0.039 and 0.055 molar. These electrolytes were used to fill cells prepared as described in example 6 where the cell gap was 125 and 88 μm. The room temperature electrochromic properties of the cells were tested using a Shimadzu 3100 spectrometer at 550 nm by applying a color potential of 1.2 volts for 50 seconds and bleached by shorting the electrical wires from the two substrates. The electrochromic properties were as follows:

| Dye Concentration (molar) | Cell Gap (μm) | Bleached, % T (550 nm) 25° C. | Colored, % T (550 nm) 1.2 volts for 50 seconds at 25° C. |
|---|---|---|---|
| 0.039 | 125 | 83.0 | 10.5 |
| 0.040 | 125 | 82.5 | 8.4 |
| 0.044 | 125 | 82.5 | 6.4 |
| 0.050 | 125 | 82.3 | 5.3 |
| 0.055 | 125 | 82.4 | 3.9 |
| 0.039 | 88 | 84.7 | 18.4 |
| 0.040 | 88 | 84.9 | 18.0 |
| 0.044 | 88 | 84.2 | 14.5 |
| 0.050 | 88 | 84.3 | 11.8 |
| 0.055 | 88 | 84.3 | 10.6 |

The percent haze in the cells was determined for a cell gap of 125 μm as a function of dye concentration and is shown below:

| Dye Concentration (molar) | % Haze |
|---|---|
| 0.0320 | 0.05 |
| 0.0382 | 0.03 |
| 0.0440 | 0.07 |
| 0.0500 | 0.07 |
| 0.0550 | 0.08 |

Example 9

A cell prepared as described in example 6 with a gap of 125 μm was filled with an electrolyte E4. The electrochromic properties of the cell was determined at 25° C. using an Ocean Optics Spectrometer. In the bleach state (uncolored) the cell had a transmission at 550 nm of 66.8% and when colored at 1.0 volts for 20 seconds had a transmission of 3.2% with a leakage current (current when a steady state in colored state is reached) of 1.94 mA/cm$^2$.

Example 10

A cell prepared as described in example 6 with a gap of 125 μm was filled with an electrolyte E5. The electrochromic properties of the cell was determined at 25° C. using an Ocean Optics Spectrometer. In the bleach state (uncolored) the cell had a transmission at 550 nm of 66.8% and when colored at 1.0 volts for 20 seconds had a transmission of 2.8% with a leakage current of 1.27 mA/cm$^2$.

Example 11

A fourth surface interior mirror cell was fabricated (about 6×25 cm) with a cavity thickness of 63 μm with the transparent conductive coatings facing inside of the cavity. The substrates were slightly offset along the long direction to provide for busbar clips. The cavity was filled with an electrolyte E1 excepting that the dye concentration was 0.055 molar. The cell was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 82.4 | 14 | 0.9 sec | 2.0 sec | 1.3 sec | 1.8 sec |

Example 12

Another mirror was fabricated by making a cell as in Example 6 with a cavity thickness of 125 μm and was then filled with the electrolyte E2 with the Fc-Vio imide dye in a concentration of 0.04M. A mirrored piece of glass was placed behind this window (sixth surface mirror) with a drop of water to reduce the reflective losses due to an air gap between the cell and the mirror. The cell was powered by applying a potential of 1.2V and bleached by shorting the two electrodes. The mirror assembly was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 78.2 | 6.2 | 1.7 sec | 4.7 sec | 3.7 sec | 7.7 sec |

Embodiment 3

EC Mirror with an Accent Ring and/or without Bezel

Most EC mirrors for vehicles in the market use a construction as shown in FIG. 1a. This prior art is shown schematically as device cross-section, where an EC mirror is constructed using two substrates 10 and 20. 21 is a transparent conductor and 11 is a layer or a layer stack which is both electrical conductor and a reflector. This is assembled into a cavity using a perimeter adhesive 15 where the cavity thickness is determined by spacers in the adhesive and/or sprinkled throughout the cavity (not shown). The interior of the cavity has an electrochromic medium 23 which may comprise of one or more layers. For electrical connections busbar clips are attached to both substrates as 17 and 18 which are then connected to powering wires 13 and 14 respectively. The busbar clips in commercial mirrors are generally made of copper-beryllium alloy as described earlier, however, beryllium free busbars are preferred. The electrical connections and the adhesive line is concealed from the user by an opaque bezel 16, generally made out of a colored plastic material (usually polypropylene, polyurethane or acrylonitrile-butadiene-styrene terpolymer).

FIG. 1a shows a third surface mirror. The surfaces on the substrate are counted from the side the mirror is viewed, where the first surface is outside surface of the first substrate, the second surface is the inner surface of the second substrate, the third surface is the inner surface of the second surface and the fourth surface is the outside surface of the second substrate. The third surface reflective layer may comprise of several coats of materials both transparent conductors and reflective layers. More on this is discussed in several U.S. patents such as U.S. Pat. Nos. 3,280,701, 5,724,187, 5,818, 625 and published US patent application 2004/0233537. When the reflector is on the third surface then the mirrors are called third surface mirrors, and when the reflector is on the fourth surface then they are called fourth surface mirrors, as shown in FIG. 1a. Typically the adhesive line that is visible from the first side and the busbars (usually clip type made of beryllium copper alloy) are hidden from the consumers by providing a molded lip (bezel) around the perimeter. Since this lip covers part of the front piece of the substrate, it results in reducing the effective area of the mirror. Typical fourth surface mirrors also have the bezel to hide the adhesive and the connections. In a fourth surface mirror, the third surface is coated with a transparent conductor and the fourth surface is coated with silver followed by a copper layer to protect silver from tarnishing and then a paint layer for general protection.

Figure 1B:
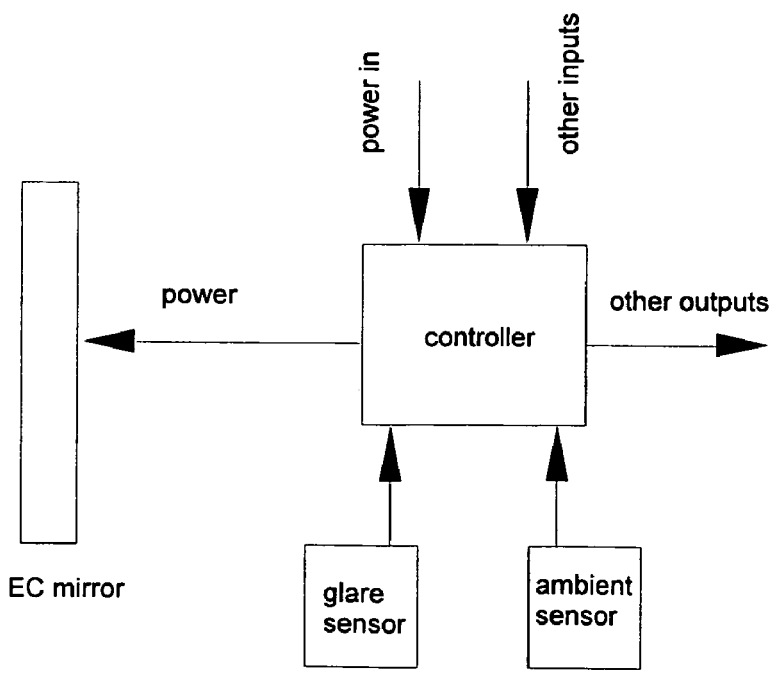
FIG. 1b: Schematics of an EC mirror assembly.

FIG. 1b shows the schematics on EC mirror assembly. The EC mirror is powered and controlled by a controller which may be in the same housing as the mirror or external to it. The controller may have integrated chips which preferably should not use any components utilizing beryllium or beryllium oxide. The controller is supplied by power from the car power system. It also receives two light intensity signals, one for glare level (typically a light transducer or sensor facing towards the rear of the car) and the other for ambient light (which is typically facing front of the car), so that it can compare and decide if the glare is being caused at night by a vehicle trailing the car with the system. The controller may have other inputs such as if the car is in reverse gear or not (so that the EC mirror darkening may be disabled automatically when reversing), inputs for other added features such as temperature, compass and others. There may be other outputs such for a display on the mirror or for headlight control, etc.

A means of eliminating this bezel and concealing the seals and the electrical connections by reflective coating are disclosed in U.S. Pat. No. 5,066,112. U.S. Pat. No. 5,066,112 is incorporated in its entirety by reference herein. As will be understood, the invention provides the advantages of concealment of or aesthetic blending of any seal structure or electrical connections for the electro-optic cell or medium thereby allowing the use of small, less conspicuous and less noticeable bezels or rims for holding the mirror, or on a backing plate without any bezel at all or it stops or terminates at the edge of the front substrate or just behind it. With a perimeter coating which is specularly reflective, the effective field of view of the mirror is increased while the seal and electrical connection areas are concealed. Typical materials for perimeter reflector coatings described in this patent are chromium, stainless steel, rhodium, platinum, palladium and/or combinations thereof. All of these colors produce white reflectors or those that typically match in color with silver and aluminum, which are generally used as mirror reflectors. Although the reflectivity of these metals is lower than silver and aluminum, however, from a color perspective they blend with them. Similar coatings are also used in commercial mirrors by Gentex Corporation (Zeeland, Mich.) described as "chrome ring technology" in their 2004 Annual report.

One objective of this invention is to use coatings in the perimeter area that are specularly reflective but have a different color as compared to the electrochromic element in the bleached state. It came to us as a surprise that using different colors still provided the functionality of enhanced area but provided a distinct accented look to the car which could also be optionally matched to the body color. In defining color, reference is made to the spectral properties of reflective surface in accordance with the parameters specified in the example. In discussing colors, it is useful to refer to the Commission Internationale de l'Eclairage's (CIE) 1976 CIELAB Chromaticity Diagram (commonly referred to as the L*a*b* chart) as well as tri-stimulus values x, y, or z. The technology of color is comprehensively discussed by F. W. Billmeyer and M. Saltzman in Principles of Color Technology, 2nd Edition, J. Wiley and Sons Inc. (1981), and the present disclosure, as it relates to color technology and terminology, generally follows that discussion. On the L*a*b* chart, L* defines lightness, a* denotes the red/green value, and b* denotes the yellow/blue value and where each of these parameters forms an axis of color sphere. The electrochromic media has an absorption/reflection spectra at each particular voltage that may be converted to a three-number designation, their L*a*b* values. To calculate a set of color coordinates, such as L*a*b* values, from the spectral transmission or reflectance, two additional items are required. One is the spectral power distribution of the source or illuminant. The present disclosure uses CIE Standard Illuminant $D_{65}$. The second item needed is the spectral response of the observer. The present disclosure uses the 2-degree CIE standard observer. The illuminant/observer combination used is represented as $D_{65}$/2 degree. Many of the examples below refer to a value Y from the 1931 CIE Standard since it corresponds more closely to the reflectance than L*. The value C*, which is also described below, is equal to the square root of $(a^*)^2 + (b^*)^2$, and hence, provides a measure for quantifying color neutrality.

As discussed above all EC mirrors made today use coatings which result in neutral color in the bleached state, which typically indicates values of C* of less than 10 and more preferably less than 5. The accented border according to this invention should have a color value C* of greater than 15, and preferably greater than 20. For example a gold colored coating may have a* and b* value of 0.97 and 40 respectively giving a C* value of 40. The accented areas may be made with multiple interference coatings stack which may be optionally followed by a reflective layer. The interference stack comprises of alternating high and low refractive index (RI) materials. Examples of high RI materials are titania, tantala and niobium oxide. Examples of low refractive index are silica. Such coatings are described in U.S. Pat. Nos. 5,138,219 and in 6,717,732. In one 3 layer stack titania layer of 2.4 RI is used in a thickness of 50 nm each sandwich a silica layer of 22 nm of RI of 1.5. Such stacks are typically used to impart a blue color, one of the preferred accents. In addition, most of the mirrors in the bleached state are highly reflective. The L* is related to the lightness of color. For example, one may also provide an accented ring by only varying L* value i.e., the depth of coloration difference between the center of the bleached mirror and the accented ring. For noticeable accent it is preferred that the L* value difference between the mirror in the center (bleached state) and that of the ring be greater than or equal to 25. As an example, the reflectivities of a chrome coating and a silver coating at 550 nm are substantially different 49 and 92% respectively, but their L* values are close, i.e., 94 and 74 respectively and are not able to form an easily perceivable accent. It is also preferred that the accent ring have a lower L* value as compared to the bleached mirror so that at night this ring (as it is not electrochromic) has less propensity to reflect light to the car driver. The accent ring may have differences in both L* and C* values, or in only one of them.

Figure 2:
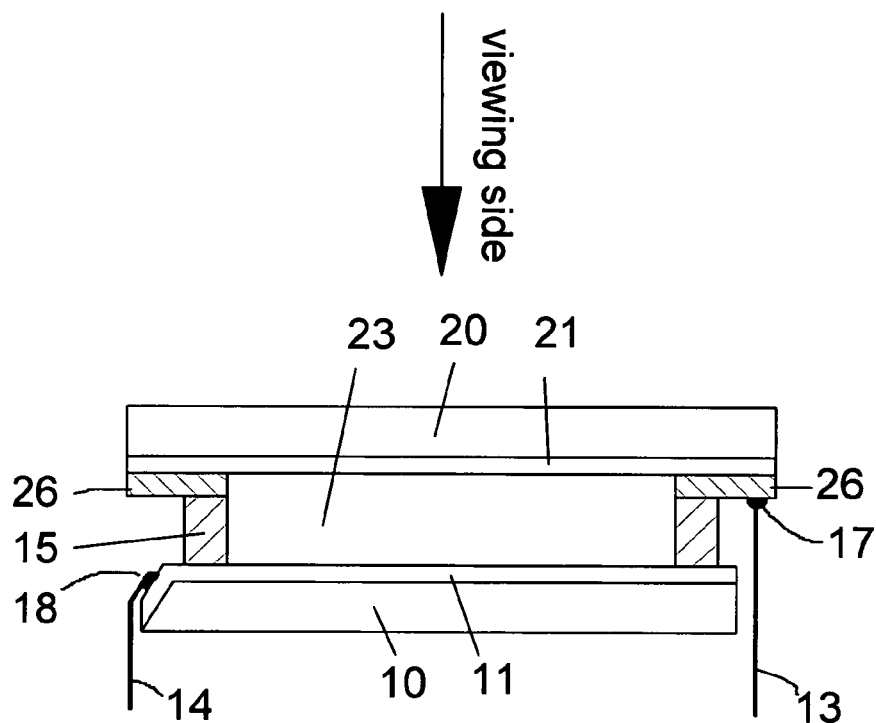
FIG. 2: Construction of an EC mirror device using concealment layer according to the present invention.

A concept to hide the seal and the electrical connection while using an accented ring as described above is shown in FIG. 2. As in FIG. 1a, the generic construction of the EC device is the same using substrates 10 and 20 with layers 11 and 21 and the EC medium 23. 26 represent a perimeter layer or a stack of layers (concealment layer) that hides the sealant 15 and the electrical connectors 17 and 18 from the viewer. The concealment layer may be electrically conductive or be insulative. Electrically conductive layers are preferred as they help in distributing the voltage more uniformly due to the limited conductivity of the transparent conductors which for mirrors are usually from about 8 to 50 ohms/square. 13 and 14 are the powering wires or tapes to these connectors which are also hidden from the viewer. It is preferred that the size of the substrate 10 is smaller than that of substrate 20 so that when one views the mirror substrate 10 is substantially within the perimeter of 20. For example, when layer 11 is both a reflector and a conductor (third surface mirror) then its conductivity is much higher generally a resistivity of less than 3 ohms/square and generally less than 1 ohm/square. Thus this may not have to run all along the side of the device. It is difficult to use a spring clip as the gap (thickness of the adhesive) between the two substrates for automotive mirrors is typically less than 200 microns. Thus as shown one of the edges is beveled to accommodate the connection. A preferred perimeter overhang of substrate 20 as compared to substrate 11 is greater than about 50 microns, and more preferably greater than about 100 microns. The seal width is preferably less than 3 mm for the mirrors. Connector 17 and 18 could be a spot, line of frit, solder, conductive adhesive, or a tape with conductive adhesive. Examples of tapes with conductive adhesives are 9703, 7303, 5352R, 5552R and 5460R and 9713 from 3M (St. Paul, Minn.)). Example of solders are silver/tin alloys, e.g., alloy 955 which is made into #44 Resin core flux solder by Kester (Chicago, Ill.) or Cerasolzer 123, 143, 186, 224, 246 and 297 from Bellex International (Wilmington, Del.) available also in lead free compositions for soldering directly onto the substrate with an ultrasonic solder. Most conductive adhesives employ silver and or nickel or nickel coated silver flakes in an epoxy matrix, some examples are those available from Emmerson and Cumming (Canton, Mass.) including ABLEBOND™ and ECCOBOND™ product lines and Loctite (Rocky Hill, Conn.). The surfaces may also be prepared before hand with primers based on silanes, to enhance adhesion. For a third surface mirror, connector 18 may cover a small area e.g. 0.25 cm² occupying the surface of 11 such as a frit, conductive adhesive or a tape with conducting adhesive.

Figure 3A:
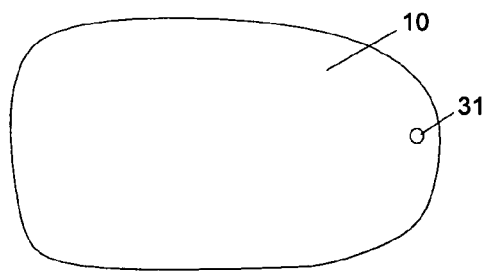
FIG. 3a: Substrate used for constructing an EC device with a via.
Figure 3B:
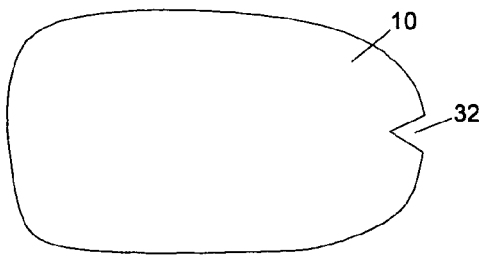
FIG. 3b: Substrate used for constructing an EC device with an edge channel.
Figure 3C:
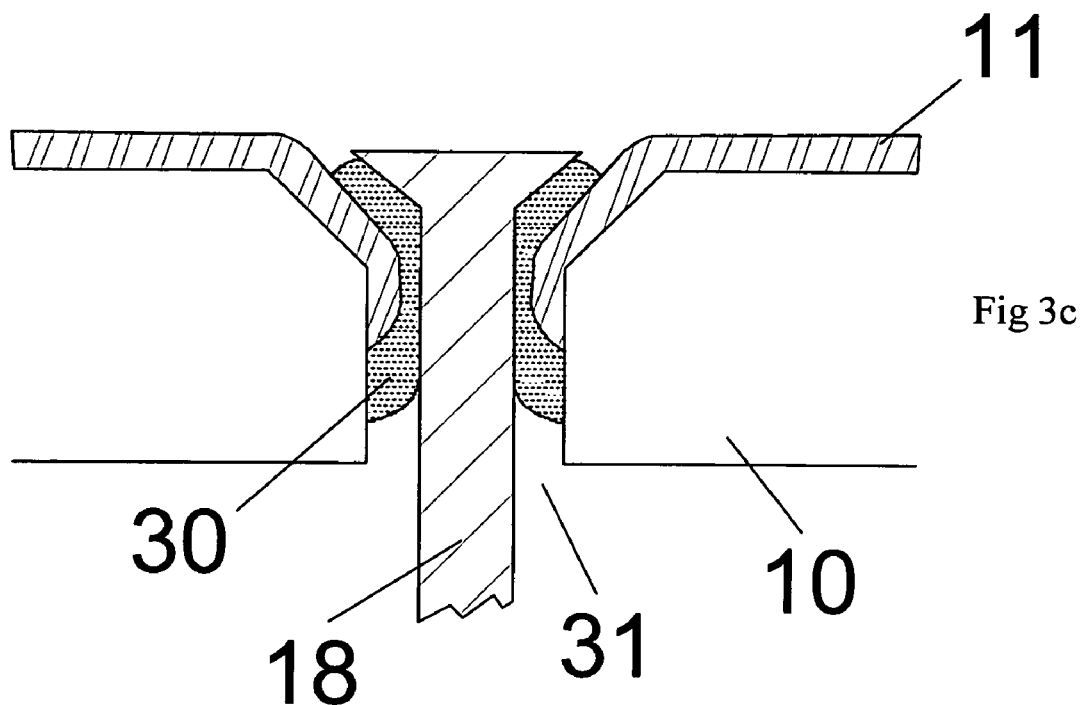
FIG. 3c: Substrate used for constructing an EC device with a via showing and electrical connections.
Figure 4:
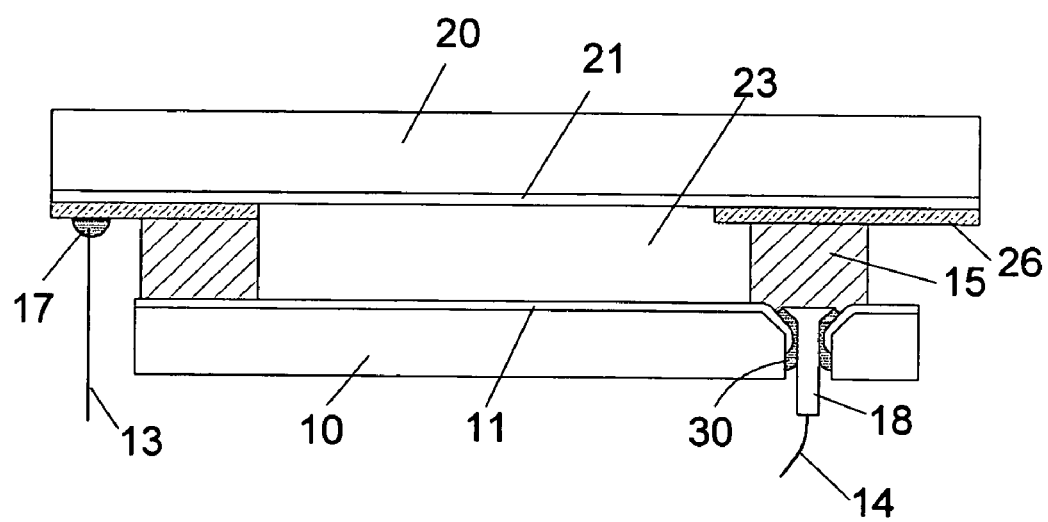
FIG. 4: Construction of an EC device using present invention using a substrate with a via.

Another innovative method of applying this connector is as following (FIG. 3a). A via 31 is formed (hole is drilled) into the substrate 10 before coating 11 is deposited. This via may also be substituted by channel 32 on the edge of the substrate (See FIG. 3b). The geometry of the via or the channel may be circular, square, triangular or any other convenient shape. FIG. 3c shows a cross-section of a substrate 10 for an EC mirror with a via 31 near its edge. This via may be a straight hole or the channel may have different geometries such as a straight cut or have a flare on the top surface as shown in FIG. 3c. The flare may also be on the bottom side (not shown). When the layer(s) 11 is deposited on the surface, e.g., by physical vapor deposition or chemical vapor deposition, it penetrates part of this via thus coating it sides into the via as shown in FIG. 3c. An electrical connection 18 is made through this via on to the layer 11 by using a solder or a conductive adhesive 30. In this example 11 is both a conductor and a reflector. There may be more than one hole or channels to make these connections. An example of an assembled EC mirror cell using these principles is shown in FIG. 4. As shown the substrate 20 has a slight overhang around the perimeter as compared to substrate 10. Coating 26 is a concealment layer and 15 is the cavity seal. 17 and 18 are the connectors to which wires 13 and 14 are respectively attached. Connector 18 is located in a via in substrate 10 and is bonded using a conductive adhesive 30. This via may be located below the cavity seal as shown or outside of the seal area.

Figure 5:
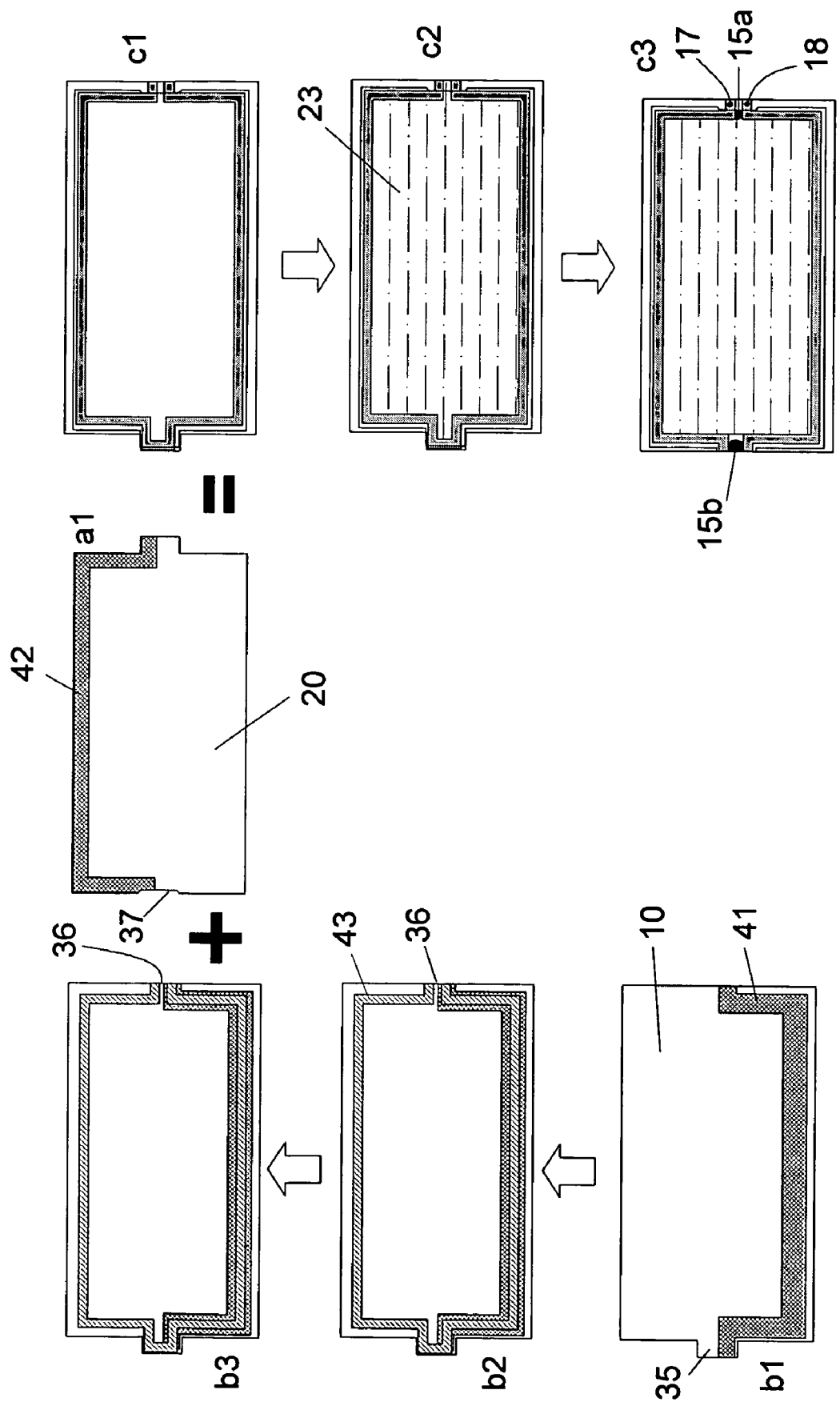
FIG. 5: Assembly process of an EC device using conductive sealant.

Another way of forming the EC device with concealed connections and using conductive adhesive is shown in FIG. 5. Conductive adhesives have been suggested for use in seals, e.g., see U.S. Pat. No. 6,665,107. However, in this they are used only for one of the electrode connections and further usable only when a third surface reflector is used. Thus two adhesives are required for making an EC cell, a conductive and a non-conductive adhesive. This is limited in scope and also difficult to manufacture. In this novel disclosure only one adhesive is used for sealant which is also conductive. This adhesive touches the conductive coating (or electrodes) on both the substrates forming the EC device but does not electrically short the two of them. This adhesive provides busbar functions to distribute the charge more uniformly, means of attaching wires and other connectors to power the mirror.

"b1" in FIG. 5 shows a substrate 10 which is already coated with a transparent conductor and a conducting perimeter concealment layer (none of these are shown). This substrate has a tab 35. Also coated along half the perimeter (within the concealment layer) is an electrically insulating layer 41. This can be a non-conductive metal oxide such as silica, alumina and titania layer or a polymeric layer such as formed from an alkyd, an epoxy, etc. which is well adhered. These can be formed through a mask or photoresists if physical vapor deposition or low viscosity primers are used (e.g., spraying, dipping or spin coating) or via silk screening or dispensing if high viscosity materials are used. A layer of a conductive adhesive 43 is then put on top of this surface within the concealment layer and also within the insulating layer as shown in "b2". Thus this conductive adhesive touches the conductive coating on the substrate in about half the perimeter as shown. The conductive adhesive also takes an excursion onto the tab 35 as shown. This conductive adhesive forms the seal between the two substrates as well as powering busbar as will be discussed later. This adhesive also has added spacer beads. There is a small opening 36 left in this adhesive for filling close to where the insulating layer ends. As shown, part of this opening is in the insulated area and part on the conductive area. Another substrate 20 with a conductive layer on is processed in parallel as shown in "a1". For a third surface mirror, this conductive layer is both reflective and conductive. On this an insulating perimeter layer 42 is deposited on about half the perimeter. The indentation 37 on its side is used for positioning the connectors as discussed later. The two substrates are then assembled with their conductive coatings facing inwards as shown in "c1" and the tab areas of both the substrates aligned on top of each other. Due to the insulative layers 41 and 42, when the bottom surface of the conductive adhesive touches the conductive coating on the bottom substrate 20 then it touches the insulating layer on the substrate 10 and vice versa. The only place where it may touch both the conductive layers and form an electrical short would be in the tab area. As shown in "c2" the adhesive is cured and the cavity is filled with the electrolyte. This can be done by backfilling which is a standard procedure. The fill hole is sealed using an adhesive 15a as shown in "c3". The tab is then cut-off and this hole is also sealed as shown as 15b using the same adhesive as used for the fill port. The adhesive for sealing 15a and 15b should be insulating and preferably UV curable, such as acrylics and epoxies. In this configuration the conductive adhesive does not connect or in a position to short the conductive coating on substrate 10 and substrate 20. For powering the leads are connected to the exposed conductive epoxy areas 17 and 18. These connectors may even be introduced when the two substrates are assembled, just before curing of the conductive epoxy so that the connectors are fastened as the epoxy cures.

As an alternate one may even provide a gap in the dispensing in the area where the tab 35 provides a break. The substrates may be made without tabs. One may even dispense a non-conducting epoxy to cover one of these breaks so that the cell can be backfilled using a fluid. Further the tab may have a hole on one of the substrates in which the fluid may be injected as discussed in US patent application 2006/0027260, which is incorporated herein by reference and then later removed. One may even make the front substrate bigger (particularly along the long side of the device so that there is room on the long side of the mirror device so that a reinforcing conductor may be provided such as a metal wire or a busbar which is also cured using the conducting adhesive. These wires (one for each side) may be long enough to also serve as the connector to the power source. One may also use the accented ring as described earlier to mask the adhesives and busbars.

Since, electrochromic cells for mirrors are generally assembled using epoxy as seal adhesives, e.g., see U.S. Pat. Nos. 5,724,187 and 6,195,193 and in published US patent application 2004/0233537. These materials may also be used for conductive adhesive formulation. Generally for formulating conductive adhesives conductive fillers are added which may also be substituted for the fillers already present in the formulations given in these references. Generally, silver flakes are added for conductivity, such as #65, #65LV, #SF77a, #SF78 from Ferro (Cleveland, Ohio). However, since the adhesive will come in contact with electrolyte it is preferred to add more electrochemically inert materials for conductivity. Some examples are nickel coated silver, silver-palladium alloy, platinum, and gold powders and flakes available from Ferro and Engelhard (Iselin, N.J.), Nickel and nickel coated graphite fibers from Inco (Toronto, Ontario, Canada), conductive carbons and graphite, e.g., from Cabot (Boston, Mass.) and carbon multi-wall nanotubes e.g., from Hyperion (Cambridge, Mass.) and carbon single-wall nanotubes, e.g. from Carbon Nanotechnologies Inc (Houston, Tex.) and ruthenium oxide American Elements (Los Angeles, Calif.). These may also be mixed in a formulation to give the desired properties. The use of conductive adhesives with carbon nanotubes is novel in EC devices, a reference on these materials can be found in Plastics Additives and Compounding Magazine (Author Daniel Colbert, Jan-Feb issue, 2003). Thermoplastic or thermoset plastic sheets which are conductive may be pre-cut and used as gaskets for sealing. Principles of seal application using films are described in U.S. Pat. No. 5,233,461.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An environmentally improved rearview mirror assembly, comprising: an electrical control circuit with at least one light transducer and a variable reflective element that is in communication with the electrical control circuit; wherein the assembly is substantially free of beryllium, and is also substantially free of lead, cadmium, and mercury.

2. An environmentally improved rearview mirror assembly, comprising: an electrical control circuit with at least one light transducer and a variable reflective element that is in communication with the electrical circuit; wherein the assembly uses busbar clips that are substantially free of beryllium and the assembly is substantially free of lead, cadmium, and mercury.

3. A single compartment electrochromic mirror assembly, wherein the assembly comprises a rear element and a transparent front element being sealably bonded together in a spaced apart relationship to define a chamber, and a solid electrolyte material contained in the said chamber, wherein the said solid electrolyte includes a multiphase solid formed by cooling a low viscosity fluid that has a viscosity less than 1,000 cP.

4. A single compartment electrochromic mirror assembly as in claim 3 where the solvent in the electrolyte is substantially non-ionic.

5. An electro-optically dimming rearview mirror for motor vehicles, said mirror comprising, in combination, front and rear spaced elements, said front element and said rear element defining a chamber therebetween sealed by a perimeter seal and powered by busbars, where the said front element of the mirror perimeter is coated with a reflective layer so as to hide from the user said perimeter seal and the busbar where the said reflective layer is accented so that its color is different from the said mirror in the bleached state and the color difference can be characterized on L*a*b* color chart as a difference in at least one of L* value of greater than 25 and a C* value greater than 15.

6. An electro-optically dimming rearview mirror for motor vehicles, said mirror comprising, in combination, front and rear spaced elements, said front element and said rear element defining a chamber therebetween sealed by a perimeter seal, wherein the said perimeter sealant is electrically conductive and configured to provide separate electronic communication with each of the front and rear elements; and the said conductive perimeter sealant in communication with the front element is electronically separated from the said conductive perimeter sealant in communication with the rear element by an electronically insulating adhesive.

7. An electro-optically dimming rearview mirror for motor vehicles, said mirror comprising,
   a. in combination, front and rear spaced elements wherein each of these elements have a conductive coating,
   b. said front element and said rear element defining a chamber therebetween with the said conductive coatings facing inside the chamber,
   c. further the said conductive coatings having part of their perimeter coated with an additional electrically insulative material
   d. and the chamber perimeter sealed by a perimeter seal, wherein the said perimeter sealant is electrically conductive and configured to provide separate electronic communication with each of the front and rear elements, and
   e. the said conductive perimeter sealant in communication with the front element is electronically separated from the said conductive perimeter sealant in communication with the rear element by an electronically insulating adhesive.

8. An electro-optically dimming rearview mirror for motor vehicles as in claim 6, wherein the said conductive perimeter sealant comprises conductive particles of at least one of nickel, nickel coated silver, silver-palladium alloy, platinum, gold, nickel coated graphite fibers, conductive carbons and graphite including carbon multi-wall nanotubes and carbon single-wall nanotubes.

* * * * *